Dec. 4, 1951            I. W. AKERS            2,577,175
INTERMITTENT TRANSPORT MECHANISM FOR
PHOTOGRAPHIC FILM AND THE LIKE
Filed Nov. 14, 1949            3 Sheets-Sheet 1
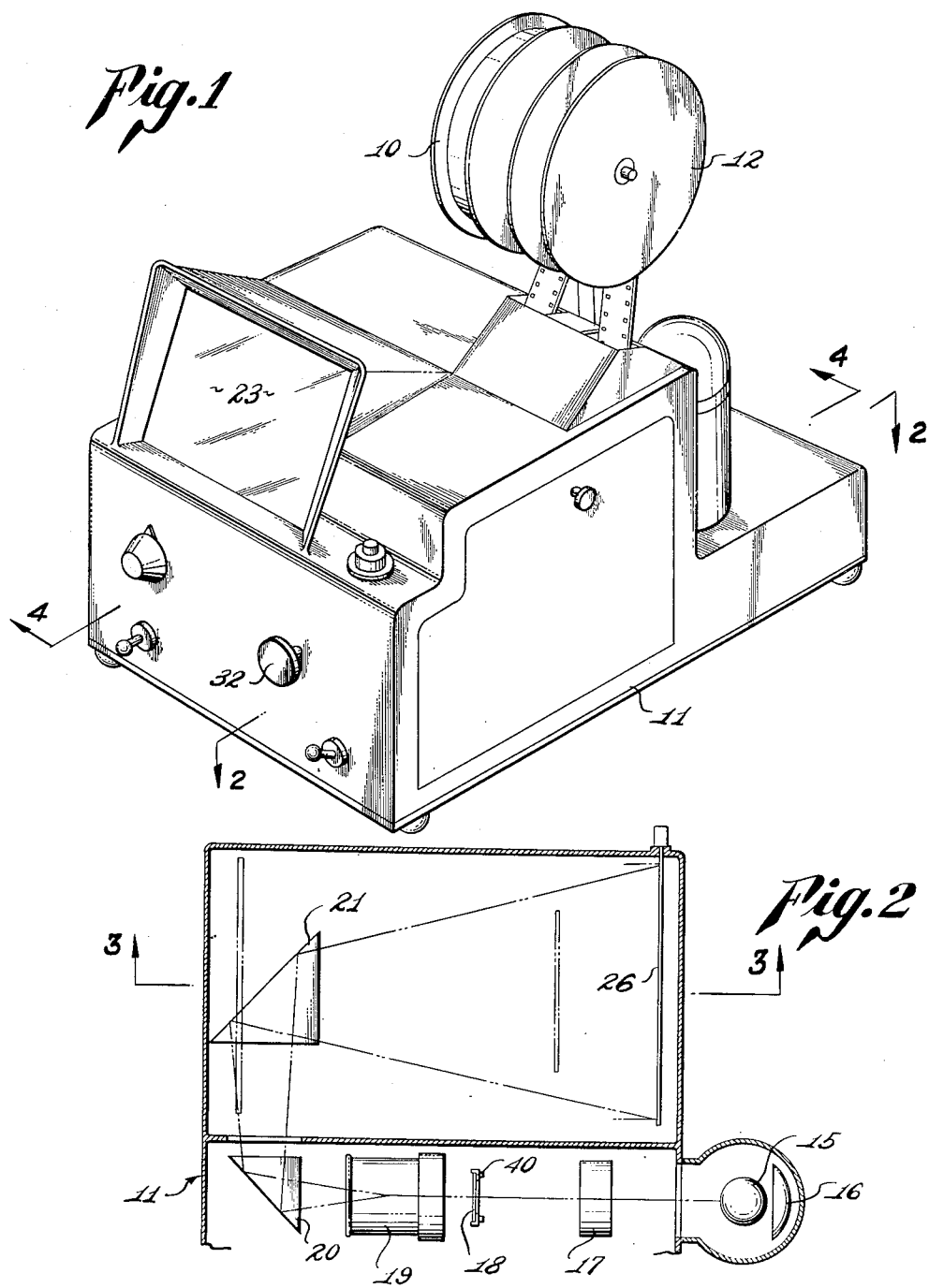
Inventor
IRVING W. AKERS
By Robert H. Falwider
Attorney Dec. 4, 1951

I. W. AKERS 2,577,175

INTERMITTENT TRANSPORT MECHANISM FOR
PHOTOGRAPHIC FILM AND THE LIKE

Filed Nov. 14, 1949

Inventor
IRVING W. AKERS
By Robert W. Fulwider
Attorney

Dec. 4, 1951 I. W. AKERS 2,577,175
INTERMITTENT TRANSPORT MECHANISM FOR
PHOTOGRAPHIC FILM AND THE LIKE
Filed Nov. 14, 1949 3 Sheets-Sheet 3

Inventor
IRVING W. AKERS
By Robert W. Fulwider
Attorney

Patented Dec. 4, 1951

2,577,175

UNITED STATES PATENT OFFICE 2,577,175

INTERMITTENT TRANSPORT MECHANISM FOR PHOTOGRAPHIC FILM AND THE LIKE

Irving W. Akers, Hollywood, Calif., assignor to Hycon Mfg. Company, a corporation of California Application November 14, 1949, Serial No. 127,058

2 Claims. (Cl. 88—18)

My invention relates generally to mechanisms for intermittently moving strip film paper, or the like, past an optical axis in photographic apparatus. Such apparatus, for example, may be motion picture cameras, projectors, and printers; still cameras or projectors using strip film, or other photographic apparatus employing strip film or paper. More particularly, the invention relates to a mechanism of the class described which employs a strip contacting element which never disengages the strip during the operation of the mechanism. Since the invention described herein may be applied with equal efficacy to various types of apparatus employing movable strips of material, such as film, paper and the like, the term "photo-strip" is used in some places herein to denote generally strips of recording material, whether they be film or paper, perforate or imperforate.

One of the problems frequently encountered in the design and operation of motion picture equipment is associated with the intermittent movement, usually referred to as the "pulldown." It is conventional practice to employ as a pull-down, one or more claws which are operated in a cyclic movement such that the claws enter certain perforations of the film, are moved linearly to advance the film, are withdrawn from said perforations, are returned to the initial starting position, and are again engaged with a new set of perforations in the film.

Such a mechanism presents a number of difficulties. For one thing, if the film moves slightly during the time that the claws are returning to the initial or starting position, the film engaging movement of the latter members may strike the film at a point between perforations or may, at the least, slide the claws against the edges of the perforations as they enter the same, resulting in a shearing action which may ultimately tear out the film between perforations. This difficulty is aggravated when the apparatus employing the claw-type of pull-down just described is subjected to severe vibrations or accelerations, such, for example, as are encountered in photo-recording apparatus mounted in aircraft, or in the recording cameras used in connection with artillery and other similar applications.

Other difficulties are encountered in the clawtype of pull-down, such, for example, as the fact that a relatively large number of intricate parts are necessary to produce the desired mode of motion of the claws themselves.

Some attempts have been made to overcome the aforesaid difficulties by moving the film continuously and rectifying the photographic image by the interposition of rotating prisms or other means. While continuous motion apparatus of the class just described has been successful for certain applications, it does not completely solve the problem of film motion, or if it does, it introduces other difficulties, such as optical aberration, and the necessity of somewhat delicate adjustment and costly design.

With a view toward solving the general problem above mentioned and others, it is a major object of the present invention to provide a transport mechanism in which the photo-strip is intermittently moved and held stationary, but in which the members engaged with the photo-strip remain continuously engaged therewith during the operation of the mechanism.

It is another object of the invention to provide a mechanism of the class described which employs a minimum of working parts and which avoids the production of intricate cam surfaces, Geneva movements, and other elements of costly design.

It is a further object of the invention to provide a mechanism adaptable either for use in moving perforated photo-strip by engagement with the sprocket holes, or alternatively, for use with unperforated material by frictional surface engagement.

The foregoing and additional objects and advantages will be apparent from a consideration of the following detailed description of one embodiment of the invention, the mechanism being shown in connection with a film viewer of the type used in editing motion picture films. It will be realized, of course, that use of a mechanism of the type about to be described is not limited to use in the editing device shown, but can be incorporated with little or no modification in a wide variety of other film-transport mechanisms.

The following description is illustrated in the attached drawings, in which:

Figure 1 is a perspective view of a film editing viewer incorporating the present invention;

Figure 2 is a horizontal section taken on the line 2—2 in Figure 1;

As above stated, the present device is incorporated for purposes of illustration in a film editing viewer. The viewer is further adapted to make separate still projection prints of individual frames in the edited motion picture at such points as may be desired. The latter feature, since it forms no essential part of the present invention, is described only briefly herein.

Figure 3:
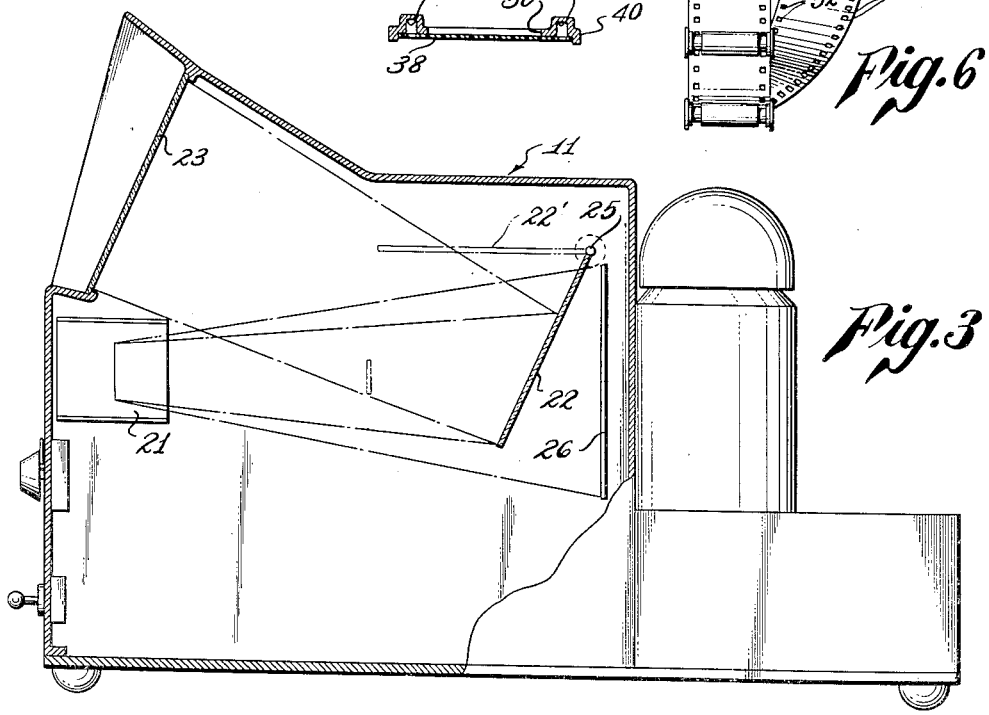
Figure 3 is a partially sectioned elevational view taken on the line 3—3 in Figure 2.
Figure 4:
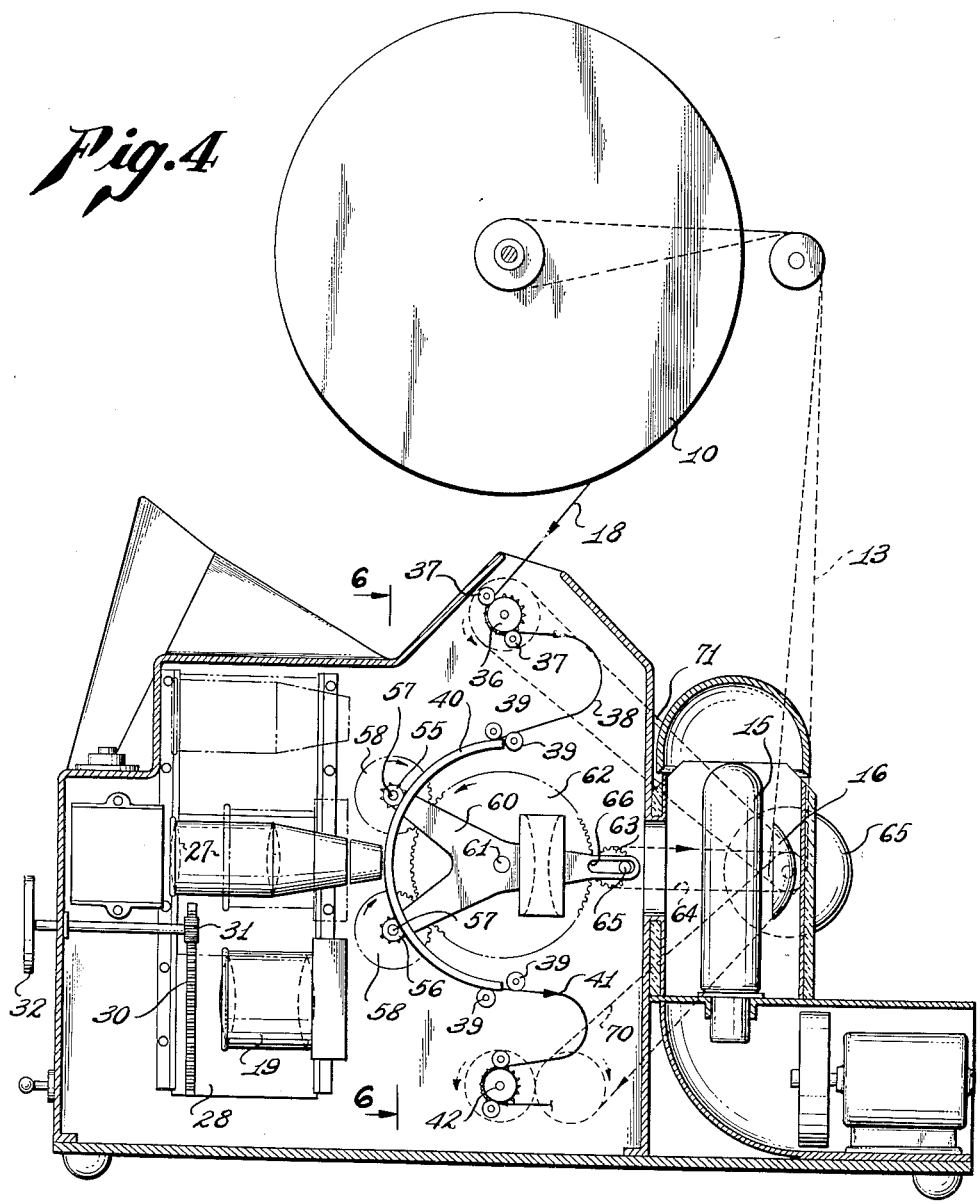
Figure 4 is an elevational section taken on the line 4—4 in Figure 1.

Referring to Figure 1, it will be seen that the film being edited is supplied from one reel 10, fed into the optical system enclosed in a cabinet or housing 11, and rewound on a take-up reel 12. A friction belt drive 13 may be provided and connected to the take-up reel, as shown in Figure 4. The optical system is best understood from an examination of Figures 2 and 3, wherein it will be seen that light from a suitable light source, such as a projection lamp 15 having a reflector 16, passes through a condensing system 17, thence through the film 18 to a projection lens system 19. The cone of light emitted by the projection system 19 passes forwardly through a right-angle prism 20, laterally through a second right-angle prism 21, and thence rearwardly to a movable inclined reflector 22, whence it is reflected forwardly and upwardly to a ground glass or similar viewing screen 23, where it may be observed from the front of the machine, as can be seen in Figure 1.

The focal length of the projection lens 19 is, of course, such as to focus the image sharply on the screen 23. In some instances, it is desired to make individual photographic prints or negatives of some particular frame in the film 18, and to this end, the reflector 22 is mounted on a rotatable hinge member 25, whereby it may be rotated upwardly to the position indicated in phantom line in Figure 3, and identified by the reference character 22'. When the reflector 22 is tilted up to the position indicated by the reference character 22', the projected rays may then pass rearwardly to a sensitized film or paper sheet 26, suitably mounted at the rear of the cabinet 11 in the position shown in Figure 3. In order to provide for the shortened optical path, a second objective 27 (see Figure 4), is mounted on a common carriage 28 with the first-mentioned objective 19, and a rack and pinion drive 30—31, together with a control knob 32 is provided, whereby the carriage 28 may be shifted vertically to place either of the projection lenses 19 or 27 in alignment with the optical axis.

Figure 6:
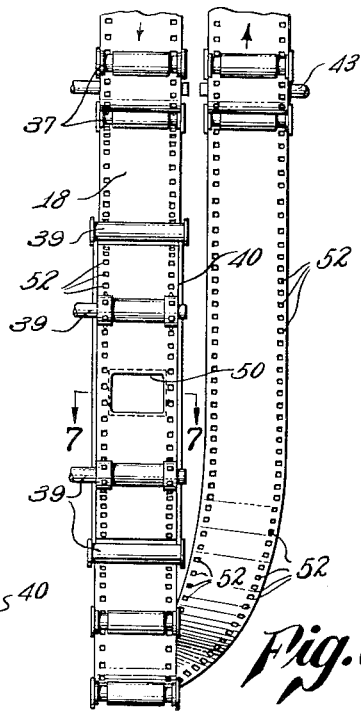
Figure 6 is an enlarged elevational section taken on the line 6—6 in Figure 4.

The film-threading path through the present apparatus is best seen in Figures 4 and 6, where it will be seen that the film 18 moves downwardly around a drive sprocket 36 fitted with conventional retaining rollers 37, thence into a take-up loop 38. From the take-up loop 38, the film 18 passes between a pair of guide rollers 39, around a curved gate member or guideway 40, thence between another pair of guide rollers 39, into a second take-up loop 41.

From the second take-up loop 41, the film 18 passes over another drive sprocket 42, similar to 36, is shifted laterally as shown in Figure 6, passes over a third drive sprocket 43, and thence to the take-up reel 12.

Figure 7:
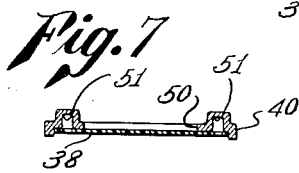
Figure 7 is a further enlarged horizontal section taken on the line 7—7 in Figure 6.

An optical aperture or gate 50 is formed in the gate member 40, as shown in Figure 6. The gate member 40 is also formed with longitudinal tooth clearance recesses 51 adjacent the edges, as shown in Figure 7, the recesses 51 underlying the row of perforations 52 along each edge of the film 18.

Figure 5:
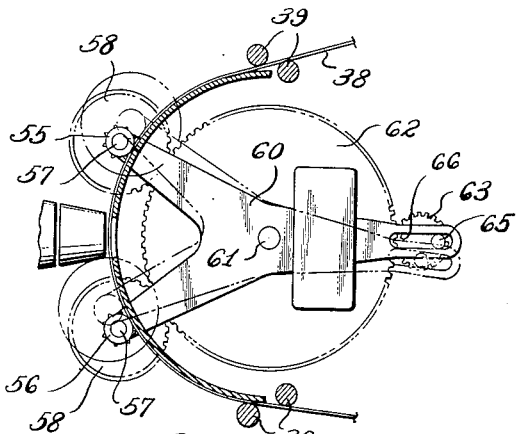
Figure 5 is an enlarged and partially sectioned portion of Figure 4, illustrating the film moving mechanism therein.

The intermittent movement of the film 18 to successively place the sequential frames thereof in alignment with the aperture 50 is effected by means of a pair of intermittent drive sprockets 55 and 56. The drive sprockets 55 and 56 are engaged with the film perforations 52 at all times during the operation of the device, the teeth projecting through the film and being received in the recesses 51. The intermittent movement of the film is achieved by oscillatory movement of the drive sprockets 55 and 56 along curved paths about the center of curvature of the gate member 40. The oscillatory movement just referred to is indicated in Figure 5, wherein the sprockets are shown in full line at a center position in said oscillatory movement, and a phantom line is used to indicate one limit of such up and down oscillatory movement. Means for producing such oscillatory movement will be described more fully hereinafter.

It will be seen that if the sprockets 55 and 56 were free to rotate during their oscillatory movement, they would roll back and forth in the perforations of the film, and thus cause no movement thereof. Conversely, if the sprockets 55 and 56 were fixed on their rotary axes, the up and down oscillatory movement would result in a concordant oscillating movement of the film. Accordingly, by means hereinafter described, the intermittent drive sprockets 55 and 56 are caused to rotate during one-half of the cycle of their oscillatory movement and are fixed against relative rotation about their axes during the other half of such cycle. In the present instance, during the time that the intermittent drive sprockets 55 and 56 are moving upwardly in their oscillatory movement, it is desired that they rotate at a speed which will cause them to roll along the film, leaving the same stationary with respect to the optical aperture 50. When the sprockets 55 and 56 reach the top of their oscillatory stroke and start downwardly, it is desired that their rotation cease, whereby they will then carry the film downwardly.

The means for causing the aforementioned intermittent rotation of the drive sprockets 55 and 56 is best understood from an examination of Figures 4 and 5. Each of the sprockets 55 and 56 is secured to a rotatable shaft 57, to which is also secured a spur gear 58. Both of the shafts 57 and the sprockets 55 and 56 and the gears 58 mounted thereon are rotatably carried in the ends of a Y-shaped lever-mount 60, which in turn, is pivotally carried on a fixed pivot shaft 61, located at the center of curvature of the gate member 40.

Also rotatably mounted on the pivot shaft 61 is a relatively large idler gear 62 which is meshed with the two sprocket gears 58. The idler gear 62 is driven in a counterclockwise direction by a drive pinion 63 which in turn is driven by a sprocket chain 64 or other suitable transmission from a drive motor 65, located at the rear of the housing 11. By reason of the coaxial relationship of the mount 60 and the gear 62, it will be seen that the pitch line of the gear 62 is parallel to the path of oscillatory motion of the sprockets 55 and 56 and their respective gears 58, and that as a consequence the gears 58 remain meshed with the idler gear 62.

As described thus far, it will be seen that at any time the mount 60 remains stationary and the idler gear 62 is driven as stated, in a counterclockwise direction, the sprocket gears 58 and the sprockets 55 and 56 will be driven at a given speed in a clockwise direction. If, on the other hand, the mount 60 is rotated in a counterclockwise direction at the same speed as the idler gear 62, it will be seen that, by reason of the fact that there is no relative movement between the gears 62 and 58, there will be no relative rotation of the sprockets 55 and 56. Still further, it will be seen that if the mount 60 is moved in a clockwise direction while the idler gear 62 is rotating in a counterclockwise direction at the same speed as the mount 60, the gears 58, and consequently the sprockets 55 and 56, will be rotated in a clockwise direction at twice the aforesaid given speed.

Thus, it can be seen that by oscillatory movement of the mount 60 about the pivot shaft 61, the sprockets 55 and 56 may be alternately rotated and held stationary (as to rotation) whereby to intermittently advance the film in the manner previously described.

Such oscillatory movement of the mount 60 about the shaft 61 is effected by an offset crank pin 65 fixed to the same shaft as the drive pinion 63. The connection between the crank pin 65 and the mount 60 is effected by a pitman connection engaging the pin 65 in a generally radial slot 66 in the stem end of the mount 60. It will be noted that the crank pin 65 is centered approximately on the pitch circle of the drive pinion 63, and thus when the pin 65 is moving upwardly and is positioned adjacent the left-hand end of the slot 66, the lever 60 is being moved at the same rate and in the same direction as the idler gear 62. At this time, the intermittent drive sprockets 55 and 56 are not rotating, as previously stated, and are therefore moving the film 18 downwardly.

When the pin 65 reaches the right-hand end of the slot 66 and is moving downwardly, the mount 60 is being moved in a direction opposite to that of the gear 62, and as a result, the sprockets 55 and 56 are being moved upwardly along their curved paths and at the same time rotated in a clockwise direction. Proportional pitched diameters of the sprockets 55 and 56 and their respective gears 58 is such that the speed of rotation during the upward movement of the sprockets 55 and 56 is such as to leave the film stationary during the largest part of said upward movement.

Additional transmission chains 70 and 71 serve to drive the film sprockets 36 and 42 from the drive motor 65 in synchronism with the intermittent movement so that the film 18 moves continuously through the mechanism, the intermittent movement of that portion of the film between the two drive sprockets 36 and 42 being compensated for by movement in the take-up loops 38 and 41, in the manner well-known in the art of motion picture photography.

It will be realized by those skilled in the art that the continuously engaged sprockets 55 and 56 could, without departing from the spirit of the present invention, be replaced by other film-engaging members, such, for example, as friction rollers having knurled surfaces or rubber surfaces to engage the film strip surface. It will also be realized that the intermittent movement disclosed herein can be used to advantage in moving other than motion picture film, for example, the films in automatic still cameras, and can be used in step printers, and other photographic processing apparatus.

While the mechanism shown and described herein is fully capable of achieving the objects and providing the advantages hereinbefore stated, it will be realized that it is capable of modification in various ways without departure from the spirit of the invention. For this reason I do not mean to be limited to the form shown and described, but rather to the scope of the appended claims.

I claim:

1. In combination in photographic apparatus of the type having an intermittently moved photo-strip positioned and guided in a predetermined threading path therein, means for intermittently advancing said strip along said path which includes: an arcuate guideway in said threading path; reciprocating means including a pivot bearing at the center of curvature of said guideway, a mount supported for pivotal movement on said pivot bearing, and power means to oscillate said mount about said pivot bearing; a pair of rotary strip-advancing members rotatably supported on said mount and each having a driving periphery substantially tangent to said guideway to engage a strip therein; and drive means for intermittent rotary motion connected to said advancing members and including a continuously and uniformly rotating rotary transmission member coaxial with said pivot bearing to rotate said advancing members whenever said mount moves in one direction and to hold said advancing member against rotation whenever said mount moves in the other direction, said power means and said rotary transmission member being operatively connected to drive said rotary transmission member at a rotary speed substantially equal to the rotary speed of forward oscillatory motion of said mount, whereby to alternately advance and immobilize said strip in said guideway, permitting the strip to be viewed at a region disposed between the two rotary strip advancing members.

2. In combination in an intermittent drive motion picture film moving mechanism: a substantially semi-circular guide having spaced parallel film supporting rails therein and an optical aperture formed between said rails; a pair of film sprockets positioned with their rotary axes transverse to said rails and with their pitch circles substantially tangent to said rails at points above and below said aperture whereby said sprockets are positioned to drivingly engage a perforated motion picture film supported on said rails; a mount for said sprockets journally supporting the same for rotation about said axes thereof; pivot bearing means having a fixed axis positioned at the center of curvature of said guide to support said mount adjacent said guide for pivotal movement of said mount about said fixed axis to carry said sprockets along curved paths parallel to said rails, whereby said sprockets remain drivingly engaged with said film during said curved movement thereof; prime mover means having a uniformly rotating drive member; a pin and slot drive connection formed between said drive member and said mount to oscillate said mount to move said sprockets in forward and retrograde motion along said paths thereof; and intermittent rotary drive means operatively connected between said drive member and said sprockets, said rotary drive means including a drive gear on said drive member, an idler gear rotatably mounted on said fixed axis and meshed with said drive gear, and a pair of driven gears, each secured to one of said sprockets for rotation therewith and meshed with said idler gear said drive member and said idler gear being operatively connected to drive said idler gear at a rotary speed substantially equal to the rotary speed of forward oscillation of said mount, whereby to hold said sprockets against rotation during forward oscillation of said mount to advance said strip along said rails, and to rotate said sprockets to roll the same along said strip during rearward oscillation of said mount to immobilize said strip with respect to said rails.

IRVING W. AKERS.

REFERENCES CITED

The following references are of record in the file of this patent:

UNITED STATES PATENTS

| Number | Name | Date |
|---|---|---|
| 574,851 | Joly | Jan. 5, 1897 |
| 963,740 | Bingham | July 12, 1910 |
| 1,039,501 | Duhem | Sept. 24, 1912 |

FOREIGN PATENTS

| Number | Country | Date |
|---|---|---|
| 3,730 | Great Britain | of 1890 |
| 15,603 | Great Britain | of 1896 |